(12) United States Patent
Lee et al.

(10) Patent No.: US 8,574,389 B2
(45) Date of Patent: Nov. 5, 2013

(54) METHOD OF MANUFACTURING THIN FILM DEVICE

(75) Inventors: Hwan-Soo Lee, Seoul (KR); Yongsoo Oh, Seongnam (KR)

(73) Assignee: Samsung Electro-Mechanics Co., Ltd., Suwon, Gyunggi-do (KR)

(*) Notice: Subject to any disclaimer, the term of this patent is extended or adjusted under 35 U.S.C. 154(b) by 141 days.

(21) Appl. No.: 12/467,134

(22) Filed: May 15, 2009

(65) Prior Publication Data

US 2010/0051191 A1    Mar. 4, 2010

(30) Foreign Application Priority Data

Sep. 2, 2008    (KR) .................... 10-2008-0086470

(51) Int. Cl.
*B32B 38/10* (2006.01)

(52) U.S. Cl.
USPC ........... 156/249; 156/230; 156/241; 156/240; 156/233; 156/237

(58) Field of Classification Search
USPC ................. 156/249, 230, 241, 240, 233, 237; 438/778, 779, 780, 464
See application file for complete search history.

(56) References Cited

U.S. PATENT DOCUMENTS

| | | | |
|---|---|---|---|
| 5,147,490 A * | 9/1992 | Leenders et al. | 156/238 |
| 6,071,795 A * | 6/2000 | Cheung et al. | 438/458 |
| 6,923,881 B2 * | 8/2005 | Tateishi et al. | 156/240 |
| 7,534,702 B2 * | 5/2009 | Arao et al. | 438/464 |
| 2003/0162312 A1 | 8/2003 | Takayama et al. | |
| 2005/0285231 A1 * | 12/2005 | Arao et al. | 257/635 |
| 2006/0055314 A1 * | 3/2006 | Nakamura et al. | 313/500 |
| 2006/0194371 A1 | 8/2006 | Okazaki et al. | |
| 2009/0188613 A1 * | 7/2009 | Fearn | 156/249 |
| 2010/0043608 A1 * | 2/2010 | Jakob | 83/13 |

FOREIGN PATENT DOCUMENTS

| | | |
|---|---|---|
| JP | 2003-229548 A | 8/2003 |
| JP | 2004-140380 A | 5/2004 |
| JP | 2006-049859 A | 2/2006 |
| JP | 2006-270072 A | 10/2006 |
| JP | 2007-027693 A | 2/2007 |
| JP | 2007-115805 A | 5/2007 |
| JP | 2009-528688 A | 8/2009 |
| JP | 2010-516021 A | 5/2010 |
| WO | WO-2005/122285 A2 | 12/2005 |
| WO | WO-2008/084956 A1 | 7/2008 |

* cited by examiner

*Primary Examiner* — Katarzyna Wyrozebski Lee
*Assistant Examiner* — Margaret Squalls
(74) *Attorney, Agent, or Firm* — McDermott Will & Emery LLP

(57) ABSTRACT

A method of manufacturing a thin film device according to an aspect of the invention may include: preparing a substrate on which a sacrificial layer and a thin film to be transferred are sequentially formed; temporarily bonding the thin film to a circumferential surface of the transfer roll, and simultaneously removing the sacrificial layer to separate the thin film from the substrate at a first position of a transfer roll that is rolling; and transferring the thin film onto a sheet by running the sheet so that a surface of the sheet is bonded to the thin film temporarily bonded to the circumferential surface of the transfer roll.
The substrate may be a transparent substrate.

14 Claims, 4 Drawing Sheets

METHOD OF MANUFACTURING THIN FILM DEVICE

CROSS-REFERENCE TO RELATED APPLICATIONS

This application claims the priority of Korean Patent Application No. 2008-0086470 filed on Sep. 2, 2008, in the Korean Intellectual Property Office, the disclosure of which is incorporated herein by reference.

BACKGROUND OF THE INVENTION

1. Field of the Invention

The present invention relates to a method of manufacturing a thin film device, and more particularly, to a method of manufacturing a thin film device using a thin film transfer process that can be used as a technique for manufacturing a flexible substrate.

2. Description of the Related Art

In general, a thin-film transfer technique has been widely used in thin film devices, such as thin film transistors (TFTs), electronic devices, and optical devices including organic EL devices.

The thin-film transfer technique generally refers to a technique that forms a predetermined thin film on a preliminary substrate and then transfers the thin film onto a permanent substrate to thereby manufacture a desired thin film device. This thin-film transfer technique can be of great use when conditions of a substrate used to form a film are different from those of a substrate used in a thin film device.

For example, even though a semiconductor thin-film forming technique requires a relatively high-temperature process, if a substrate used in a thin film device has low thermal resistance or a low softening point and a low melting point, the thin-film transfer technique can be very advantageously applied. Particularly, the thin-film transfer technique can be advantageously applied to flexible thin-film devices.

In the related art, since a flexible device needs to have flexibility, an organic substrate formed of, such as a polymer, is used, and an organic thin film serving as a functional unit is disposed on the top of the organic substrate. However, since it is difficult to ensure high performance by the functional unit formed of the organic thin film, an inorganic material, such as polysilicon (poly-Si) or an oxide thin film, is used to form a functional unit of the flexible device. Here, since it is difficult to directly apply the high-temperature semiconductor film forming technique to the flexible substrate formed of the organic material, the thin-film transfer technique that transfers a thin film formed of an inorganic material, such as a semiconductor, onto another preliminary substrate is used.

However, a surface that is separated from the preliminary substrate is provided as an upper surface of the thin film transferred onto the permanent substrate, and remnants of a sacrificial layer remain on the upper surface. Therefore, a process of removing the remnants of the sacrificial layer is further required in order to prevent it having an adverse effect on the thin film device.

When a thin film pattern is required, a patterning process is generally performed after transferring the thin film onto the permanent substrate. If the patterning process has been previously performed, the permanent substrate, used as a support substrate, may be damaged by laser irradiation when removing the sacrificial layer in order to separate the permanent substrate from the preliminary substrate.

However, when the patterning process is performed after the thin film has been transferred onto the permanent substrate, thermal-chemical damage to the permanent substrate caused by the patterning process needs to be considered.

SUMMARY OF THE INVENTION

An aspect of the present invention provides a method of manufacturing a thin film device that can simplify a process, increase reliability of a device, and significantly increase mass production by changing a surface of an object of transfer that is bonded to a permanent substrate by use of a temporary support roll.

According to an aspect of the present invention, there is provided a method of manufacturing a thin film device, the method including: preparing a substrate on which a sacrificial layer and a thin film to be transferred are sequentially formed; temporarily bonding the thin film to a circumferential surface of the transfer roll, and simultaneously removing the sacrificial layer to separate the thin film from the substrate at a first position of a transfer roll that is rolling; and transferring the thin film onto a sheet by running the sheet so that a surface of the sheet is bonded to the thin film temporarily bonded to the circumferential surface of the transfer roll.

The substrate may be a transparent substrate.

The sacrificial layer may be removed by irradiating a laser beam onto the sacrificial layer through the transparent substrate.

The sacrificial layer may be formed of a material including ITO, ZnO, or $SnO_2$.

The thin film and the circumferential surface of the transfer roll may be temporarily bonded to each other as the transfer roll rotates while being compressed against the separated surface of the thin film.

The circumferential surface of the transfer roll may be formed of a polymeric material including a polydimethylsiloxane (PDMS)-based polymer or a silicon rubber-based polymer.

The method may further include applying an adhesive layer to a bonding surface of the sheet before transferring the thin film onto the sheet.

The preparing of the substrate may further include patterning the thin film to form a thin film pattern, and the thin film to be transferred may be the thin film pattern.

The thin film pattern may include a functional portion pattern performing a particular function and a support portion pattern connected to the functional portion pattern and having a larger area than the functional portion pattern, and the method may further include removing the support portion pattern except for the functional portion pattern after the transferring of the thin film.

The method may further include forming a protective layer on the substrate having the thin film bonded thereto after the transferring of the thin film.

The sheet may be formed of a flexible material.

The thin film may be a semiconductor thin film.

The thin film may be a metallic thin film.

The thin film may be a thin film for a display device.

The method may further include patterning the thin film transferred to the sheet to form a thin film pattern after the transferring of the thin film.

The method may further include forming a protective layer on the sheet having the thin film pattern bonded thereto after the forming of the thin film pattern.

The sheet may be run by a plurality of guide rolls.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
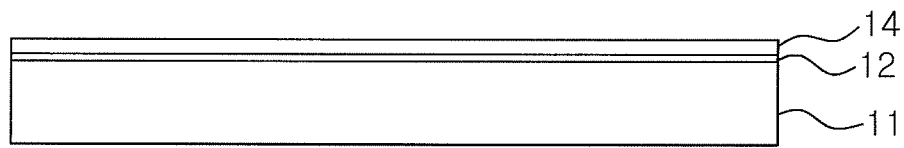
FIG. 1 is a view schematically illustrating a lamination in which a thin film is formed that is used in an exemplary embodiment of the present invention.

FIG. 1 is a view schematically illustrating a lamination on which a thin film is formed that is used in an exemplary embodiment of the invention.

Referring to FIG. 1, a lamination is illustrated in which a sacrificial layer 12 and a thin film 14 are sequentially formed on a substrate 11.

The substrate 11 is a preliminary substrate on which a thin film 14 is formed. Furthermore, the substrate 11 is formed of a material having durability in the high-temperature film forming process of forming the desired thin film 14. In general, a laser lift off (LLO) method is used for the separation of the thin film 14 to be transferred. This is also considered when selecting the material that forms the first substrate 11. That is, the substrate 11 may be formed of a material having greater band gap energy than the band gap energy corresponding to the wavelength of the laser beam, such that the laser beam can be transmitted through the first substrate 11.

In this embodiment, a transparent substrate may be used as the first substrate 11. However, the invention is not limited thereto. The first substrate 11 may be formed of any one of sapphire, quartz, glass, magnesium oxide (MgO), a lanthanum aluminate (LaAlO$_3$), fused silica, or zirconia.

The "sacrificial layer 12" is a layer formed of a material that can be decomposed by the laser to be used. In a subsequent process, a laser beam may be transmitted through the first substrate 11 to decompose the sacrificial layer 12.

In order to selectively remove the sacrificial layer 12, a focus control method may be used to focus the laser energy onto the sacrificial layer 12. However, it is desirable that the materials of the first substrate 11 and the sacrificial layer 12 be appropriately selected according to the wavelength of the laser beam to be used.

The sacrificial layer 12 may include a transparent conductive oxide layer having an energy band gap enabling the absorption of the wavelength of the laser to be used. However, the invention is not limited thereto. The sacrificial layer 12 may be formed of a material such as ITO, ZnO or SnO$_2$. A thin film that absorbs the wavelength of the laser to be used and can be easily melted, that is, a thin film that contains another low-melting point material, for example, a polymer, In, or Pb, may be used.

The thin film 14 has a structure used to form a functional unit of a desired thin film device. The thin film 14 may be formed of an inorganic material, such as a semiconductor or polysilicon, or a metal. Alternatively, the thin film 14 may be formed of amorphous silicon or polysilicon for a display device.

The thin film 14, serving as the functional unit, may be patterned, which will be described below. The thin film 14 may be formed using a known film forming technique, such as sputtering, evaporation, and CVD.

Figure 2A:
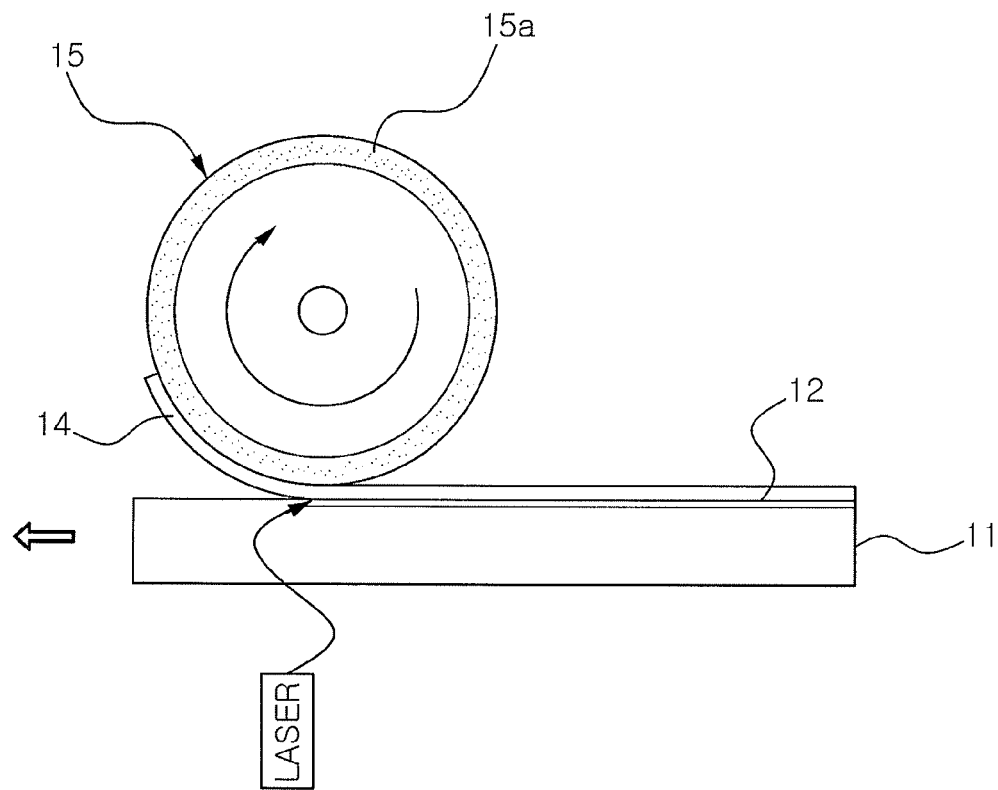
FIGS. 2A and 2B are cross-sectional views illustrating the principle of a transferal process that is used in a method of manufacturing a thin film device according to an exemplary embodiment of the present invention.
Figure 2B:
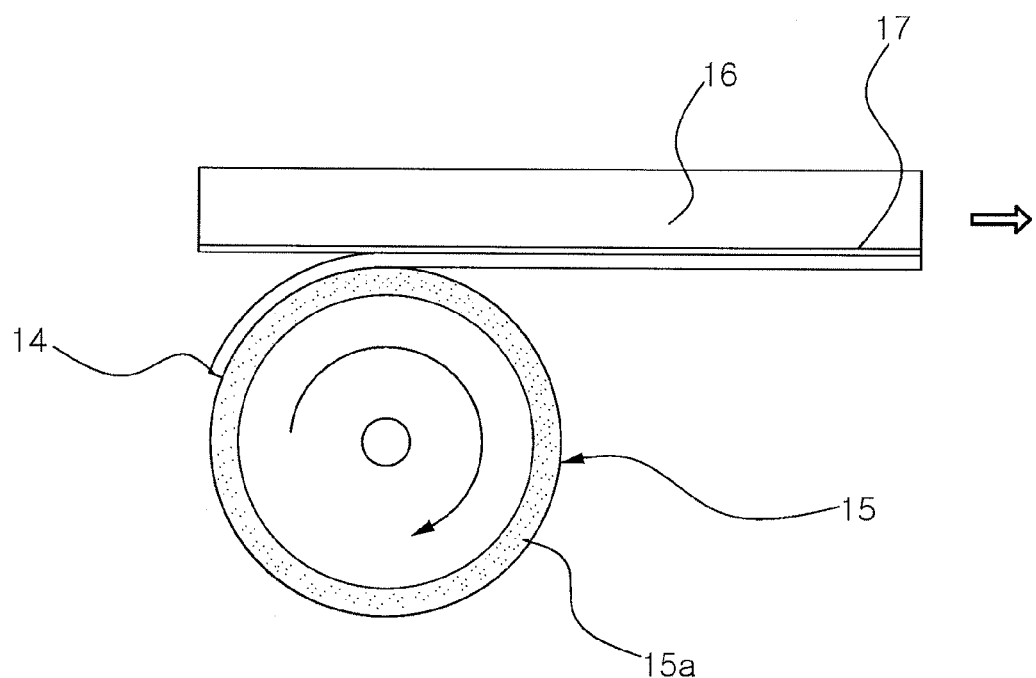

FIGS. 2A and 2B are cross-sectional views illustrating the principle of a transferal process that is used in a method of manufacturing a thin film device according to an exemplary embodiment of the invention. In FIGS. 2A and 2B, the same roll is used at different positions, but for convenience of explanation, a description will be made by separating the temporary bonding process (performed together with a laser lift off process) and the bonding process.

It can be understood that a temporary bonding process, illustrated in FIG. 2A, is performed at the same time as the a process of separating the thin film 14 is performed using the laser lift off process. That is, at a first position (under the roll in FIG. 2A), the sacrificial layer 12 is removed so that the thin film 14 is separated from the substrate 11. At the same time, the thin film 14 may make tight contact and be temporarily bonded to a circumferential surface of a transfer roll 15 that is rolling.

The sacrificial layer 12 is removed so that the thin film 14 can be separated from the substrate 11. As for this removal process, various known removing processes, such as chemical etching, can be considered. However, in this embodiment, a laser lift off (LLO) method may preferably be used. That is, a laser hu is irradiated through the bottom of the transparent substrate 11, and the sacrificial layer 12 absorbs the wavelength of the laser light and is thermally decomposed and removed.

However, it is difficult to expect the complete removal of the sacrificial layer 12 by this removal process. Therefore, the remnants of the sacrificial layer 12 may remain on the separation surface of the thin film 14. However, in this embodiment, the separated thin film 14 is not directly transferred onto a sheet but is temporarily bonded to the transfer roll 15, which is a temporary support structure. The separation surface on which the remnants of the sacrificial layer remain can be provided as a surface to which the sheet, which is a permanent substrate, is bonded.

At the same time as the above-described separation process, the circumferential surface of the transfer roll 15 that is rolling makes tight contact with the surface of the thin film 14 and is temporarily bonded thereto. Here, the transfer roll 15 can be understood as a temporary support structure that is used before the thin film 14 is transferred to the sheet (permanent substrate).

The term "temporary bonding", used throughout this specification, can be understood as a bonding state in which a bonding strength is maintained enough to support and handle the thin film 14 at least before the transferal process.

The "temporary bonding" process refers to a bonding process that is performed neither by the use of an additional unit, such as an adhesive, nor by fusion welding using a high-temperature heat treatment process.

Preferably, the temporary bonding process may be performed by making tight contact between smooth surfaces of the thin film 14 and the transfer roll 15 so that the thin film 14 and the roll 15 are temporarily bonded to each other by the van der Waals force. The temporary bonding process can be sufficiently performed under low pressure at room temperature. Therefore, after the thin film 14 is transferred onto the sheet, which will be used as a permanent substrate, the circumferential surface of the transfer roll can be easily separated from the thin film 14. Further, even after the circumferential surface of the transfer roll 15 is separated from the thin film 14, a clean surface of the thin film 14 from which the support structure 15 is separated can be ensured.

In order to more easily perform temporary bonding by the van der Waals force, the circumferential surface of the transfer roll 15 may be preferably formed of, for example, a polymeric material, such as a polydimethylsiloxane (PDMS)-based polymer and a silicon rubber-based polymer. Like this embodiment, a temporary support structure may be provided to facilitate a desired temporary bonding process by forming an outer circumference 15a, provided as the circumferential surface of the transfer roll 15, using the above-described polymeric material. However, the present invention is not limited to the above material. The outer circumference 15a may be formed of any material that can facilitate the above-described temporary bonding by the similar interface action.

Then, as shown in FIG. 2B, a sheet 16 is run so that the surface of the sheet 16 can be bonded to the thin film 14, temporarily bonded to the circumferential surface of the transfer roll 15, at a second position (upper part in FIG. 2B) of the transfer roll 15 that is rolling. As a result, the thin film 14 is transferred to the surface of the sheet 16.

Here, the sheet 16 is a permanent substrate where the thin film 14 is transferred, constituting a thin film device.

In this process, the thin film 14 and the sheet 16 are bonded to each other to have a higher bonding strength than a bonding strength between the transfer roll 15 and the thin film 14 that are temporarily bonded to each other. To this end, like this embodiment, an adhesive material layer 17 may be additionally coated over the sheet 16. As a result, the thin film 14 and the sheet 16 may have a high bonding strength because of the adhesive material layer 17. Therefore, as shown in FIG. 2B, the thin film 14 and the transfer roll 15, which is rolling, can be relatively easily separated from each other due to a relatively low bonding strength therebetween. Particularly, as described above, when the thin film 14 and the transfer roll 15 are temporarily bonded to each other by the van der Waals force, the separation surface of the thin film 14 can be very clean even after the transfer roll 15 is separated therefrom.

The thin-film transfer technique according to this embodiment can be used for various thin film devices. Specifically, even when a semiconductor film forming technique requires a relatively high-temperature process, if a substrate used in the device has low thermal resistance or a low softening point and a low melting point, the thin-film transfer technique can be very advantageously used. Particularly, the thin-film transfer technique can be advantageously applied to flexible thin film devices.

Figure 3:
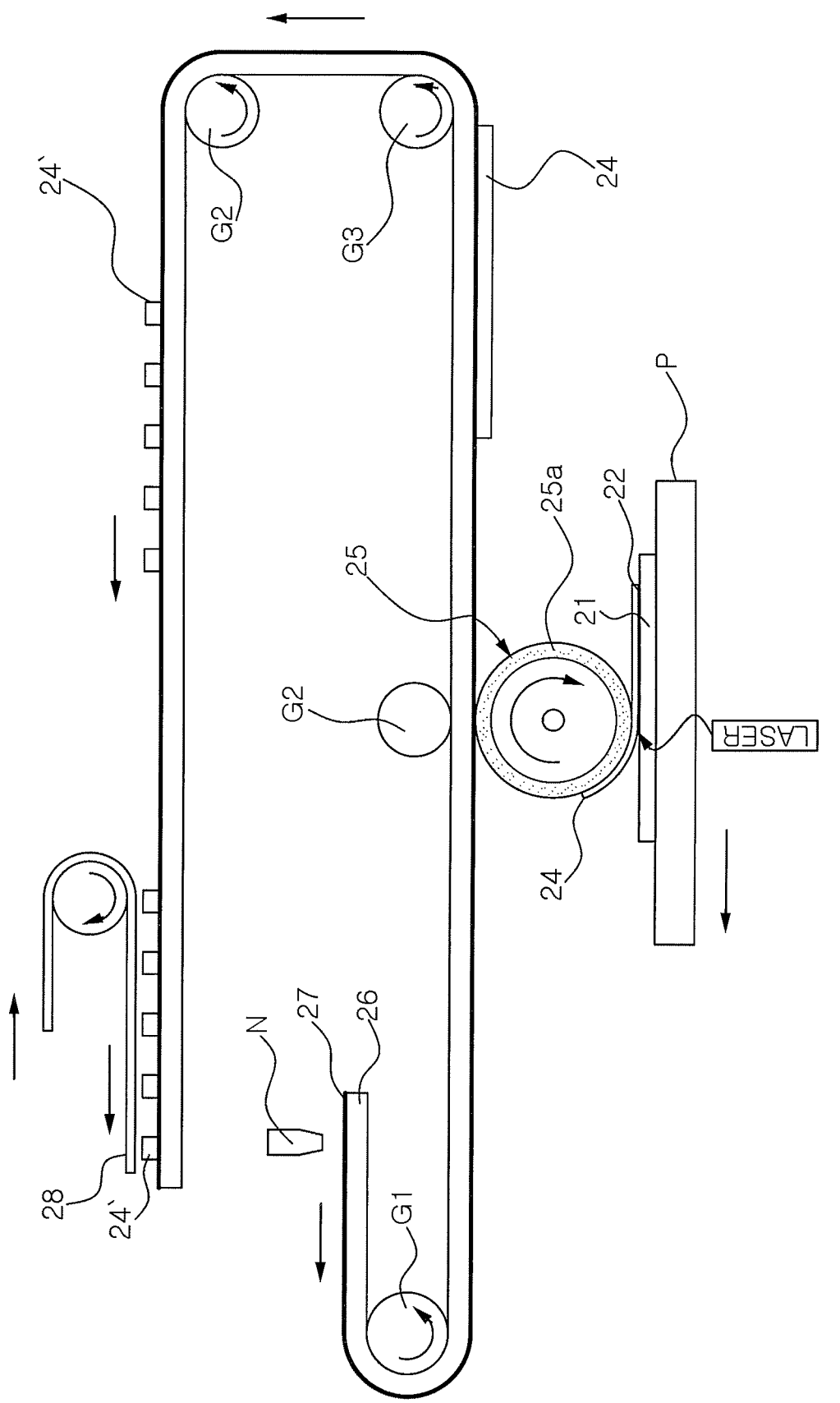
FIG. 3 is a schematic view illustrating a roll transfer process plant to realize a method of manufacturing a thin film device according to an exemplary embodiment of the present invention.

FIG. 3 is a view illustrating a roll transfer process plant used to realize a continuous process of manufacturing a thin film process by a roll transfer technique.

As shown in FIG. 3, a substrate 21 on which a sacrificial layer 22 and a thin film 24 are sequentially formed is located under a transfer roll 25 and is disposed on a flat panel P.

The sacrificial layer 22 is removed by laser irradiation to remove the thin film 24 from the substrate 21. At the same time, the thin film 24 makes tight contact with the circumferential surface of the transfer roll 25, which is rolling, and is temporarily bonded thereto. An outer circumference 25a, which is provided as a circumferential surface of the transfer roll 25, may be formed of a polymeric material, such as a polydimethylsiloxane (PDMS)-based polymer or a silicon rubber-based polymer, to facilitate a desired temporary bonding process.

A sheet 26, which will be used as a permanent substrate, is run by a plurality of guide rolls G1 to G4 at an opposite side to the transfer roll 25, that is, at an upper part. The sheet 26 may be run so that the sheet 26 can be bonded to the thin film 24 temporarily bonded to the transfer roll 25. The sheet can be bonded to the thin film 24 by an adhesive layer 27 using a spray nozzle N at a position where the sheet is located before reaching the roll (in this embodiment, a running start position), such that the thin film 24 and the circumferential surface of the roll 25, which are temporarily bonded to each other, can be separated from each other.

In this embodiment, the thin film 24, which has been transferred to the sheet 26, is subjected to a patterning process, in a batch process, thereby obtaining a desired thin film pattern 24'. Then, a protective layer 28 is formed to protect the thin film pattern 24' formed on the sheet 26. In this embodiment, an insulating resin sheet is used as the protective layer 28 to perform the batch process. However, the protective layer 28 may be formed using insulating resin according to a known coating process, such as spin coating.

However, as shown in FIG. 3, instead of performing the process of patterning the thin film after the transferal process, the thin film may be patterned to form a thin film pattern in a process of preparing the substrate. In this case, the thin film pattern is preferably continuous so that the thin film pattern to be transferred is smoothly temporarily bonded to the transfer roll and transferred onto the sheet.

The functional unit, the thin film or the thin film pattern, illustrated in the above-described embodiment, may be understood as a pattern unit that performs a desired particular function of the thin film device. When the functional unit is patterned to have a small width, a sufficient bonding area is not provided. As a result, it may prove difficult to perform temporary bonding by simply making contact between the patterned functional unit and the support structure.

To realize the temporary bonding, a thin film pattern may include a functional portion pattern performing a particular function and a support portion pattern connected to the functional portion pattern and having a larger area than the functional portion pattern. Here, a process of removing the support portion pattern other than the functional portion pattern after the transferal process may be further included.

Figure 4:
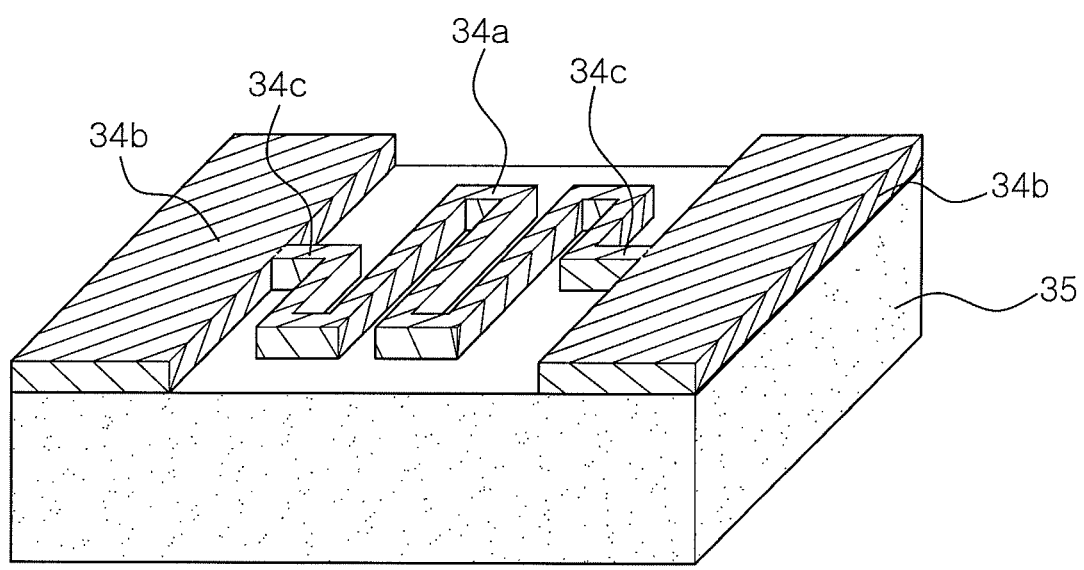
FIG. 4 is a perspective view illustrating one example of a thin film pattern that can be applied to a method of manufacturing a thin film device (flexible device) according to a specific embodiment of the present invention.

As shown in FIG. 4, an additional support portion pattern may be formed to ensure a bonding area.

Referring to FIG. 4, one example of a thin film pattern that can be used in a method of manufacturing a thin film device (flexible device) according to a specific embodiment of the invention is illustrated. It may be understood that a thin film pattern 34 is temporarily bonded to a support structure and separated from a first substrate.

The thin film pattern 34, illustrated in FIG. 4, includes a functional portion pattern 34a and a support portion pattern 34b. The support portion pattern 34b is connected to the functional portion pattern 34a through a connection portion pattern 34c and has a larger area than the functional portion pattern 34a.

Since the functional portion pattern 34a does not have a sufficient bonding area, it may be difficult to make contact between the functional portion pattern 34a and the support structure 35 by temporary bonding. However, the functional portion pattern 34a can be temporarily bonded to a support structure 35 through the support portion pattern 34b that is located on both sides and has a relatively large area. The support portion pattern 34b and the connection portion pattern 34c except for the functional portion pattern 34a may be transferred onto a second substrate and then removed.

As set forth above, according to exemplary embodiments of the invention, mass production of a technique of manufacturing a thin film device using a transfer technique can be significantly increased using a roll process. Further, a process of removing remnants of a sacrificial layer can be omitted by providing a separation surface of a thin film or a thin film pattern as a surface to be bonded to a permanent substrate, and problems caused by the remnants can be solved.

Further, a process of changing a bonding surface by use of a support structure can be easily performed by the action at the material interface, such as the van der Waals force, without using a separate adhesive layer, thereby simplifying the entire process.

Furthermore, the invention allows a process of patterning a thin film to be performed on a preliminary substrate, and can be effectively used as a process of manufacturing a flexible device.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of manufacturing a thin film device, the method comprising:
    preparing a substrate on which a sacrificial layer and a thin film are sequentially formed;
    temporarily bonding the thin film to a circumferential surface of a transfer roll that is rolling and simultaneously removing the sacrificial layer to separate the thin film from the substrate, wherein the thin film is temporarily bonded to the transfer roll at a first position of the transfer roll, and wherein the sacrificial layer is removed by irradiating a laser beam onto the sacrificial layer through the substrate; and
    bonding the thin film to a sheet with the transfer roll, wherein the thin film is bonded to the sheet at a second position of the transfer roll, wherein the thin film is bonded to the sheet by running the sheet so that a surface of the sheet is bonded to the separated surface of the thin film, and wherein the first position of the transfer roll and the second position of the transfer roll are located at different positions along the circumferential surface of the transfer roll;
    wherein the transfer roll comprises a singular roller and the first position and the second position of the transfer roll are located along a circumferential surface of the singular roller;
    wherein the preparing of the substrate further comprises patterning the thin film to form a thin film pattern to be bonded comprising a functional portion pattern performing a particular function and a support portion pattern connected to the functional portion pattern which has a larger area than the functional portion pattern; wherein after bonding of the patterned thin film a step of removing the support portion pattern from the functional portion pattern is conducted.

2. The method of claim 1, wherein the substrate is a transparent substrate.

3. The method of claim 1, wherein the sacrificial layer is formed of a material including ITO, ZnO, or $SnO_2$.

4. The method of claim 1, wherein the thin film and the circumferential surface of the transfer roll are temporarily bonded to each other as the transfer roll rotates while being compressed against the separated surface of the thin film.

5. The method of claim 4, wherein the circumferential surface of the transfer roll is formed of a polymeric material including a polydimethylsiloxane (PDMS)-based polymer or a silicon rubber-based polymer.

6. The method of claim 1, further comprising applying an adhesive layer to a bonding surface of the sheet before the bonding of the thin film onto the sheet.

7. The method of claim 1, further comprising forming a protective layer on the substrate having the thin film bonded thereto after the bonding of the thin film.

8. The method of claim 1, wherein the sheet is formed of a flexible material.

9. The method of claim 1, wherein the thin film is a semiconductor thin film.

10. The method of claim 1, wherein the thin film is a metallic thin film.

11. The method of claim 1, wherein the thin film is a thin film for a display device.

12. The method of claim 1, further comprising patterning the thin film bonded to the sheet to form a thin film pattern after the bonding of the thin film.

13. The method of claim 12, further comprising forming a protective layer on the sheet having the thin film pattern bonded thereto after the forming of the thin film pattern.

14. The method of claim 1, wherein the sheet is run by a plurality of guide rolls.

* * * * *